(12) United States Patent
Wade

(10) Patent No.: US 10,113,927 B2
(45) Date of Patent: Oct. 30, 2018

(54) FLIP CHIP PRESSURE SENSOR ASSEMBLY

(71) Applicant: Honeywell International Inc., Morris Plains, NJ (US)

(72) Inventor: Richard Wade, Worthington, OH (US)

(73) Assignee: Honeywell International Inc., Morris Plains, NJ (US)

(*) Notice: Subject to any disclaimer, the term of this patent is extended or adjusted under 35 U.S.C. 154(b) by 261 days.

(21) Appl. No.: 15/052,506

(22) Filed: Feb. 24, 2016

(65) Prior Publication Data

US 2017/0241852 A1    Aug. 24, 2017

(51) Int. Cl.
| | |
|---|---|
| *G01L 1/16* | (2006.01) |
| *G01L 1/18* | (2006.01) |
| *G01L 9/06* | (2006.01) |
| *G01L 9/08* | (2006.01) |
| *G01L 9/00* | (2006.01) |

(52) U.S. Cl.
CPC .......... *G01L 9/0054* (2013.01); *G01L 9/0048* (2013.01)

(58) Field of Classification Search
CPC ..... G01L 1/16; G01L 1/18; G01L 9/00; G01L 9/0048; G01L 9/0054; G01L 9/06; G01L 9/08
See application file for complete search history.

(56) References Cited

U.S. PATENT DOCUMENTS

| | | | |
|---|---|---|---|
| 4,665,754 A * | 5/1987 | Glenn | ................... G01L 9/0054 29/621.1 |
| 5,581,038 A | 12/1996 | Lampropoulos et al. | |
| 5,625,151 A | 4/1997 | Yamaguchi | |
| 6,432,737 B1 | 8/2002 | Webster | |
| 6,441,503 B1 | 8/2002 | Webster | |
| 9,082,883 B2 * | 7/2015 | Protheroe | ........... B81C 1/00269 |
| 2012/0152037 A1 * | 6/2012 | Wade | ....................... G01L 1/18 73/862.627 |
| 2013/0247689 A1 | 9/2013 | Thanigachalam et al. | |

FOREIGN PATENT DOCUMENTS

| | | |
|---|---|---|
| WO | 2015065639 A1 | 5/2015 |
| WO | 2017147234 A1 | 8/2017 |

OTHER PUBLICATIONS

International Application No. PCT/US2017/019024, International Search Report and Written Opinion of the International Searching Authority, dated Aug. 16, 2017, 13 pages.

\* cited by examiner

*Primary Examiner* — Nguyen Ha
(74) *Attorney, Agent, or Firm* — Honeywell International Inc.

(57) ABSTRACT

A flip chip pressure sensor assembly. The flip chip pressure sensor assembly comprises a substrate; a pressure sensor die comprising a sensing diaphragm, the die having a top side and a bottom side that is reverse to the top side, where the top side of the die is electrically connected to the substrate by flip chip mounting technology; a cover defining an aperture disposed over the pressure sensor die, where the aperture defined by the cover aligns with the sensing diaphragm to provide a path for pressure to be transmitted through the aperture to the bottom side of the sensing diaphragm; and a gel disk disposed within the aperture in intimate contact with a bottom side of the sensing diaphragm, where the gel disk is domed above an outer shoulder of a rim defined by the cover.

20 Claims, 4 Drawing Sheets

FLIP CHIP PRESSURE SENSOR ASSEMBLY

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Technology advances continue to enable reducing the size of sensors. As sensor features and/or components are reduced in size, new manufacturing problems are encountered that are not experienced when manufacturing sensors having larger feature sizes. It is a challenge to mass manufacture sensors while maintaining performance standards and production yields as sensor size is reduced. At the same time, a variety of markets for end products using sensors are aggressively pushing continued size reductions.

SUMMARY

In an embodiment, a flip chip pressure sensor assembly is disclosed. The flip chip pressure sensor assembly comprises a substrate; a pressure sensor die comprising a pressure sensing diaphragm, the die having a top side and a bottom side that is reverse to the top side, where the top side of the die is electrically connected to the substrate by flip chip mounting technology; a cover defining an aperture disposed over the pressure sensor die, where the aperture defined by the cover aligns with the pressure sensing diaphragm to provide a path for pressure to be transmitted through the aperture to the bottom side of the pressure sensing diaphragm; and a seal between the cover and the pressure sensor die.

In another embodiment, a pressure sensor assembly is disclosed. The pressure sensor assembly comprises a substrate; a pressure sensor die comprising a sensing diaphragm, the die electrically connected to the substrate; a cover defining an aperture disposed over the pressure sensor die, where the aperture defined by the cover aligns with the sensing diaphragm to provide a path for pressure to be transmitted through the aperture to the sensing diaphragm; and a gel disk disposed within the aperture in intimate contact with the sensing diaphragm, where the gel disk is domed above an outer shoulder of a rim defined by the cover.

In yet another embodiment, a pressure sensor assembly is disclosed. The pressure sensor assembly comprises a substrate; a pressure sensor die comprising a sensing diaphragm, the die electrically connected to the substrate; a cover defining an inner shoulder at a first end of the cover, defining an aperture disposed over the pressure sensor die, and defining one of a deformable wall or a collapsible wall at a second end of the cover opposite to the first end, where the aperture defined by the cover aligns with the sensing diaphragm to provide a path for pressure to be transmitted through the aperture to the sensing diaphragm and where the second end of the cover is in intimate contact with the substrate; and a seal between the inner shoulder of the cover and an outer perimeter of the bottom side of the pressure sensor die.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
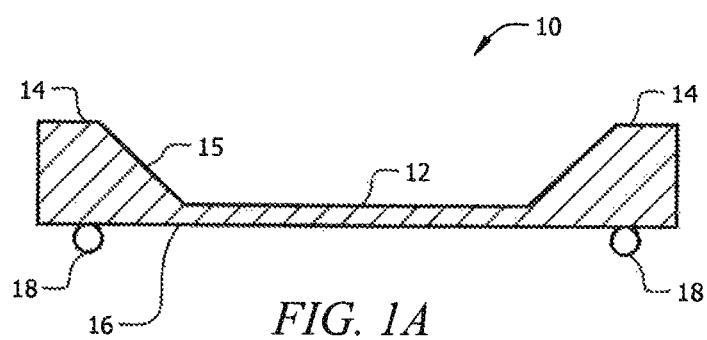
FIG. 1A and FIG. 1B are illustrations of a flip chip pressure sensor die according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Force sensors and/or pressure sensors are used in a wide variety of applications including, for example and without limitation, industrial robots and surgical robots (e.g., in joints of robot arms to sense force), in infusion pumps used to deliver medications and/or IV solutions into human beings, in aspirators to measure lung capacity, in other medical devices, and in measuring fluid pressures in airplane applications and/or HVAC applications. It is understood that a sensor that responds to force inputs may be employed to measure pressure, for example by dividing the measured force by an area to which the force is applied. Said in another way, a force sensor may, in some circumstances (e.g., pressure applied to a constant surface area of a mechanical plunger coupled to the force sensor), output a signal that is proportional to a pressure (e.g., pressure×area=force, hence pressure is proportional to force) and may be said to sense pressure. The present disclosure refers to flip chip pressure sensors, but it is understood that the teachings may also be applied to flip chip force sensors.

There is an ongoing push from the industry to reduce the size of pressure sensors. For example, by reducing the size and expense of medical devices sufficiently, in part by reducing pressure sensor size, it may be possible to provide medical patients with personal and/or disposable devices that obviate the need of hospitals to own and manage these devices. The deployment of medical devices owned by patients may increase the amount of out-patient care versus in-office care or in-hospital care, thereby reducing healthcare expenditures. Further in the future, drug delivery mechanisms may move away from the pill form for delivering drugs to patients to quasi-continuous direct infusion of the active drug with dosage controlled, at least in part, based on feedback from small pressure sensors.

A micro mechanical electrical system (MEMS) pressure sensor die may be the component that senses pressure in a pressure sensor assembly (e.g., transduces mechanical force to an electrical property such as current). As pressure sensor dies get smaller, the area consumed by wire bonds on the MEMS pressure sensor die becomes the limiting factor on further size reduction. The space consumed by wire bonds may be negligible when the size of the MEMS pressure sensor is about 25 millimeters (mm) on a side (e.g., 25 mm×25 mm). The space consumed by wire bonds becomes a consideration when the size of the MEMS pressure sensor die approaches about 5 millimeters (mm) on a side (e.g., 5 mm×5 mm). Wire bonds in a MEMS pressure sensor die about 2 mm on a side (e.g., 2 mm×2 mm) may consume about 30% of the space of the die. Wire bonds in a MEMS pressure sensor die about 1 mm on a side (e.g., 1 mm×1 mm) may consume about 50% of the space of the die. The present disclosure contemplates dispensing with wire bonds for connecting the pressure sensor die to the pressure sensor assembly, for example electrically connecting the die to a substrate and/or printed circuit board, and relying instead on what is commonly referred to as flip chip mounting technology. The use of flip chip mounting technology can largely overcome the limitations on reduction of size in pressure sensor dies posed by wire bonds.

MEMS devices are typically manufactured using processing methods employed in the semiconductor industry. Many MEMS devices are fabricated on a single semiconductor wafer, and the wafer is later sawed up to separate the MEMS devices. The structures of the MEMS devices are built up using successive layers, from bottom to top where the "bottom" is the semiconductor wafer and the "top" is the last layer deposited (i.e., the layer deposited last in time). These definitions of "bottom" and "top" are used throughout this specification when referring to the pressure sensor die. During fabrication of MEMS devices intended for use in flip chip mounted applications, metallized pads are deposited on the top layer of the MEMS devices that are electrically connected to electrical conducting paths (e.g., "wires" or "electrical traces") within the MEMS devices, and solder bumps are deposited on these metalized pads. Later, after sawing up the wafer to separate the MEMS devices, a MEMS device is flipped over (i.e., its "bottom" side is turned to face up while its "top" side is turned to face down), its solder bumps are aligned with matching pads on an external circuit (i.e., a substrate or printed circuit board) positioned below the MEMS device, and the solder in the solder bumps is re-melted (i.e., reflow solder processing) to provide an electrical connection to the external circuit. Other methods of providing electrical connection of the flip chip to the external circuit are, for example, thermosonic bonding and thermocompression bonding.

Figure 1B:
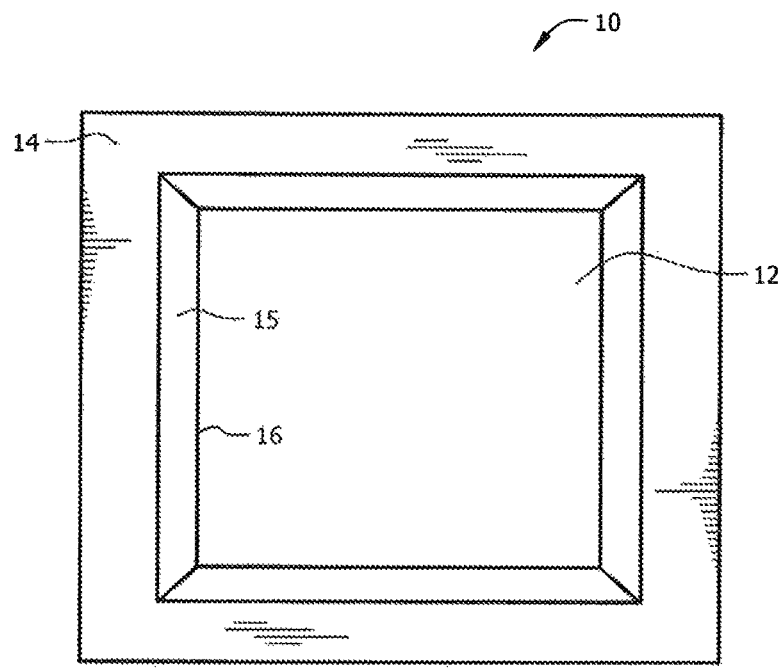

Turning now to FIG. 1A and FIG. 1B, a pressure sensor die 10 is described. FIG. 1A shows a sectional view of the die 10, while FIG. 1B shows a plane view of the die 10. In an embodiment, the pressure sensor die 10 may sense or measure pressure incident on the die 10. In an embodiment, the pressure sensor die 10 may sense or measure force incident on the die 10. In an embodiment, the die 10 is a MEMS device manufactured with MEMS fabrication processes. The die 10 is provided with solder bumps or solder balls for use in flip chip mounting to a substrate and/or printed circuit board. In an embodiment, the die 10 comprises a pressure sensing diaphragm 12, an outside edge 14, an edge-to-diaphragm joint 16, and a plurality of solder bumps 18. While two solder bumps 18 are illustrated in FIG. 1A, it is understood that the die 10 may comprise any number of solder bumps 18. In some contexts, the outside edge 14 may be referred to as the outside perimeter of the die 10. In an embodiment, the die 10 may be generally square in planar shape. In another embodiment, the die 10 may be rectangular in planar shape. In another embodiment, the die 10 may be polygonal in planar shape, for example triangular, pentagonal, hexagonal, etc. In yet another embodiment, the die 10 may be generally circular in planar shape or oval in planar shape. In an embodiment, the die 10 may be less than about 5 mm×5 mm in planar size (e.g., less than about 25 square millimeters ($mm^2$) in planar area), less than about 2 mm×2 mm in planar size, less than about 1 mm×1 mm in planar size, less than about ½ mm×½ mm in planar size, or smaller yet in planar size. Over time it is contemplated that the planar size of the pressure sensor dies 10 will get smaller as MEMS fabrication processing improves and as other associated manufacturing processing improves. In an embodiment, the diaphragm 12 may be about 50 micrometers (μm) or microns thick.

The outside edge 14 of the die 10 may be referred to in some contexts as the "picture frame" of the die 10. The outside edge 14 or picture frame narrows from a greater thickness to the thinner thickness of the diaphragm 12 over a sloped surface 15. In an embodiment, the sloped surface 15 makes an about 125° angle with the "bottom" side of the diaphragm 12. Alternatively, the sloped surface 15 makes an about 125.3° angle with the "bottom" side of the diaphragm 12. In an embodiment, one or more piezoresistive element is located within the die 10 proximate to the edge-to-diaphragm joint 16, close to the surface on the "top" side of the die 10, for example about 10 μm below the surface of the "top" side of the die 10, about 5 μm below the surface of the "top" side of the die 10, about 2.5 μm below the surface of the "top" side of the die 10. While the above-described shapes, dimensions, thicknesses, and angles are generally representative of the physical geometry of the pressure sensor die 10, it will be appreciated that other pressure sensor dies 10 that differ in one or more aspects of their physical geometry from those described above are also contemplated by the present disclosure and may also benefit from the teachings of this disclosure. For example, in an alternative embodiment the diaphragm 12 may be as thick as the outside edge 14 and hence the die 10 would not have the sloped surface 15 in that alternative embodiment.

As pressure and/or force is applied to the diaphragm 12, the diaphragm 12 experiences mechanical stress, and the resistance of the one or more piezoresistive elements changes. When stimulated by an externally applied voltage (e.g., via the solder bumps 18 connected to an external circuit such as an external printed circuit board) an electrical current through the piezoresistive elements changes as the diaphragm 12 experiences mechanical stress from applied pressure and/or force, and this difference in electrical current can be mapped to an indication of pressure and/or force. In some contexts the pressure sensing diaphragm 12 may be referred to as a sensing diaphragm, bearing in mind that it may transduce either pressure or force.

Figure 2A:
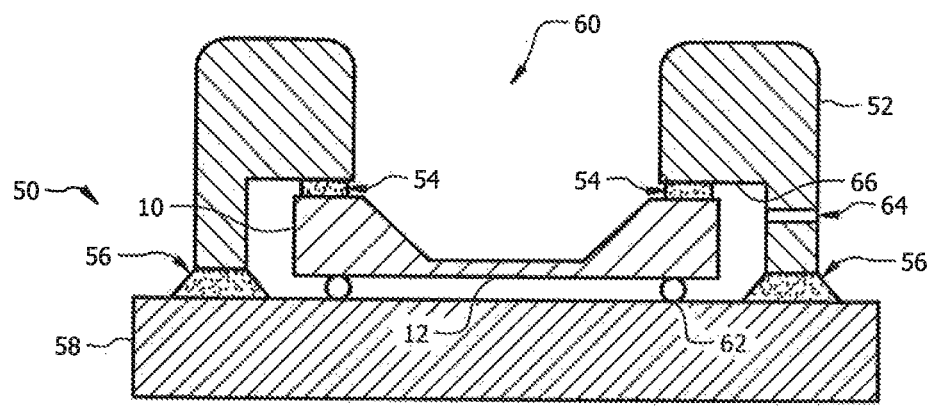
FIG. 2A, FIG. 2B, and FIG. 2C are illustrations of a flip chip pressure sensor assembly according to an embodiment of the disclosure.
Figure 2B:
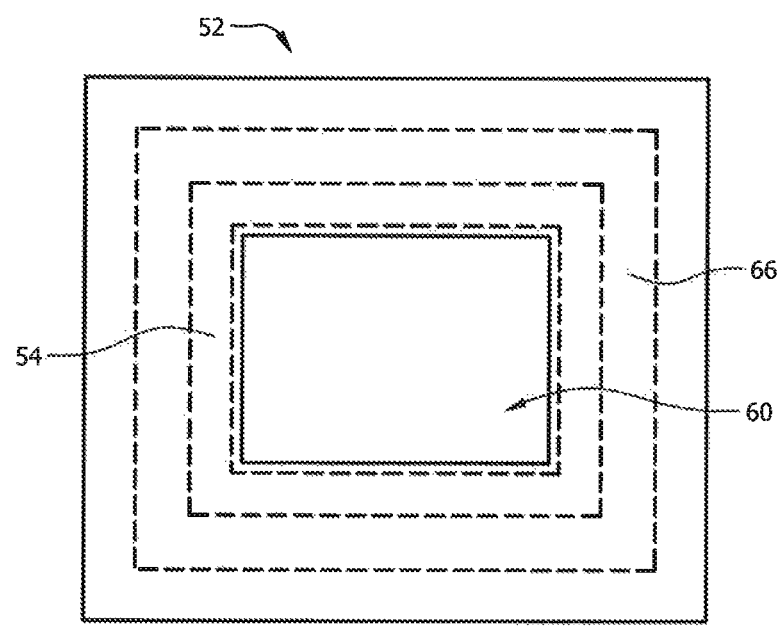
Figure 2C:
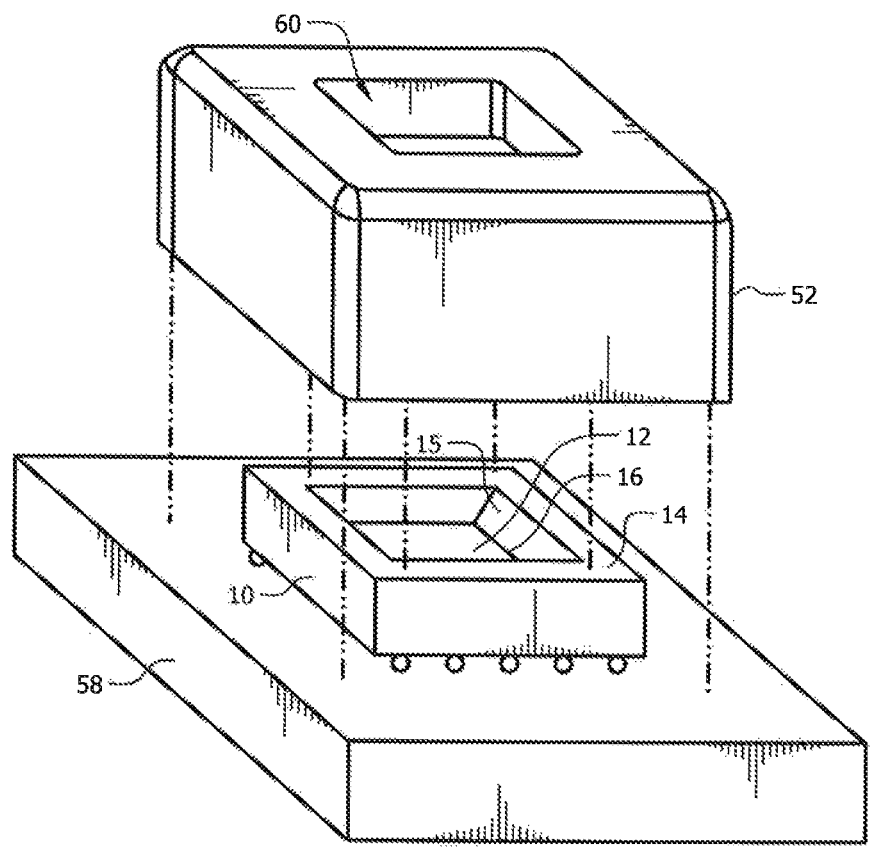

Turning now to FIG. 2A, FIG. 2B, and FIG. 2C, a first pressure sensor assembly 50 is described. In an embodiment, the first pressure sensor assembly 50 comprises the pressure sensor die 10, a cover 52, a first seal 54 between the cover 52 and the outside edge 14 (or "the picture frame") of the die 10, and a second seal 56 between the cover 52 and a substrate 58. The die 10 is electrically connected to the substrate 58 by a plurality of solder joints 62 using flip chip mounting technology. In an embodiment, the seals 54, 56 may be provided by a glue or by an adhesive. In an embodiment, one of the seals 54, 56 may be a compliant media (e.g., O-ring or seal gasket) and the other one of the seals 54, 56 may be an adhesive or glue. In an embodiment, one of the seals 54, 56 may be a compliant media (e.g., O-ring or seal gasket) and the other one of the seals 54, 56 may be a snap or locking feature to hold the cover 52 in place on the substrate 58. In an embodiment, both seals 54, 56 may be a compliant media (i.e., O-ring or seal gasket).

The substrate 58 may be a ceramic substrate and/or a printed circuit board. It is noted that the substrate 58 is different from and not to be confused with a semiconductor substrate on which a MEMS component may be fabricated. The substrate 58 provides some mechanical stress isolation (e.g., rigidity to the die 10 and to the first pressure sensor assembly 50 generally. The substrate 58 comprises electrical wires, electrical conductors, and/or electrical traces (not shown) that connect to the die 10 via the solder joints 62 and that promote connecting the first pressure sensor assembly 50 to external circuitry (not shown), for example to a plug or jack terminating a wire leading to an embedded computer, for example a computer embedded in a medical instrument.

The flip chip mounting of the die 10 to the substrate 58 by the solder joints 62 electrically connects the die 10 to the substrate 58. The solder joints 62 additionally mechanically attach or couple the die 10 to the substrate 58. In traditional flip chip mounting of MEMS devices to substrates, an underfill comprising an electrically insulating adhesive is commonly flowed under the "top" side of the MEMS device, filling the space between the "top" side of the MEMS device and the substrate. This underfill may provide a stronger mechanical coupling of the MEMS device to the substrate and may promote better heat flow away from the MEMS device. The improved mechanical coupling provided by the underfill can reduce mechanical loads on the solder joints, thereby reducing the risk of one or more of the solder joints failing which would result in the function of the MEMS device failing or becoming unreliable and/or inconsistent.

In the pressure sensor assembly 50, however, underfill can induce mechanical stress on the diaphragm 12 which in turn can offset the output of the first pressure sensor assembly 50. While this offset output could theoretically be compensated for by external circuitry and/or processing, underfill suffers from the further disadvantage that the mechanical stress that it induces changes over time and hence even a compensated output would drift over time, rendering the pressure sensor output inaccurate. Consequently, in at least some embodiments of the pressure sensor assembly 50, underfill is not employed in mounting the die 10 to the substrate 58. It is understood, however, that in other embodiments, underfill may be employed in mounting the die 10 to the substrate 58, for example using an underfill material that does not induce mechanical stress or that induces a mechanical stress that does not change over time or, for example in an application where even the time varying mechanical stress of underfill material can be compensated for during processing. The seals 54, 56 and the case 52 provide some improved mechanical stabilization of the pressure sensor die 10, reducing the mechanical stress on the solder joints 62.

The cover 52 defines an aperture 60 or opening. When the cover 52 is sealed to the die 10 and to the substrate 58 by seals 54, 56, the aperture 60 is aligned with the diaphragm 12 so as to provide a path for pressure and/or force to be transmitted through the aperture 60 to the "bottom" side of the diaphragm 12. In an embodiment, the cover 52 defines a shoulder 66 on an inner edge of the cover 52, and the first seal 54 is disposed between the shoulder 66 and the "picture frame" (e.g., the outside edge 14) of the die 10. In some contexts, the shoulder 66 may be referred to as an inner shoulder. The cover 52 may be a molded plastic component, a stamped metal component, or a component formed of a different material or in a different way.

In an embodiment, the cover 52 defines at least one vent hole 64. The vent hole 64 may be round, oval, square, rectangular, polygonal, or another shape. The vent hole 64 provides fluid communication between an exterior ambient pressure and an interior chamber of the first pressure sensor assembly 50, where the interior chamber is defined as the space between the first seal 54, the second seal 56, the cover 52, the substrate 58, and the "top" side of the pressure sensor die 10. Thus, the pressure sensor die 10 of the first pressure sensor assembly 50 provides an electrical indication of a pressure differential between ambient pressure (or any other reference pressure that may be provided via the vent hole 64) and a fluid pressure applied to the "bottom" side of the diaphragm 12, for example an air pressure, a gas pressure, a liquid pressure, or other fluid pressure. In another embodiment, one or more vent hole may be located in the substrate 58 (e.g., a drilled hole) and no vent hole 64 may be provided in the cover 52. If the substrate 58 is a printed circuit board, a vent hole may be provided in the substrate 58 by routing out the vent hole in the substrate 58. If the substrate 58 is ceramic, a vent hole may be provided in the substrate 58 by laser drilling. In some embodiments, however, it may be less expensive to provide the vent hole 64 in the cover than to provide a vent hole through the substrate 58 in a precise location that aligns with the small size of the die 10. Alternatively, in an embodiment, the second seal 56 (e.g., a seal adhesive) may not be continuous and may provide communication over those discontinuous portions of the second seal 56.

In addition to providing a reference pressure (e.g., ambient pressure) to the "top" side of the diaphragm 12, the vent hole 64 promotes curing and/or drying of the seals 54, 56. Without providing the vent hole 64, the first seal 54 and/or the second seal 56 may not cure and/or dry properly.

In an end application, the aperture defined by the cover 52 aligns with and is mechanically coupled to a tube, channel, or manifold containing a fluid whose pressure is desired to be sensed (e.g., an edge of an exterior wall of the cover 52 mechanically couples to the tube or channel). The tube, channel, or manifold may be sealed to the cover 52 in such a way that the pressure in the tube, channel, or manifold does not propagate to the vent hole 64 and/or does not propagate to the ambient. For example, the pressure sensor assembly 50 and the cover 52 may be secured to the tube, channel, or manifold with an O-ring providing a seal between cover 52 and the tube, channel, or manifold.

Figure 3:
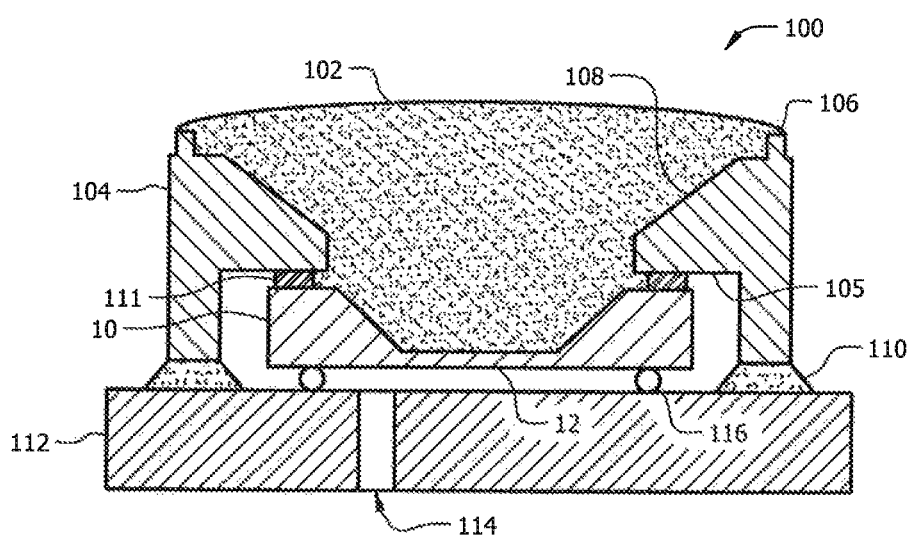
FIG. 3 is an illustration of another flip chip pressure sensor assembly according to an embodiment of the disclosure.

Turning now to FIG. 3, a second pressure sensor assembly 100 is described. The second pressure sensor assembly 100 may be referred to as a gel coupled pressure sensor in some contexts. In an embodiment, the second pressure sensor assembly 100 comprises the pressure sensor die 10, a gel disk 102, a cover 104, a first seal 111, a second seal 110, and a substrate 112. The cover 104 defines an aperture in its middle and an outer shoulder 106 having a flat surface that stops at an outer edge defined by a sharp drop-off of the surface of the cover 104. The angle made by the flat surface of the outer shoulder 106 with the drop-off surface of the outer edge of the cover 104 may be between about 220° to about 270°. When the cover 104 is sealed to the die 10 by first seal 111 and sealed to the substrate 112 by second seal 110, the aperture defined by the cover 104 is aligned with the diaphragm 12 so as to provide a path for pressure and/or force applied to the surface of the gel disk 102 to be coupled by the gel disk 102 through the aperture of the cover 104 to the "bottom" side of the diaphragm 12.

In an embodiment, the seals 110, 111 may be formed of glue or adhesives. In an embodiment, one of the seals 110, 111 may be a compliant media (e.g., O-ring or seal gasket) and the other one of the seals 110, 111 may be an adhesive or glue. In an embodiment, one of the seals 110, 111 may be a compliant media (e.g., O-ring or seal gasket) and the other one of the seals 110, 111 may be a snap or locking feature to hold the cover 104 in place on the substrate 112. In an embodiment, both seals 110, 111 may be a compliant media (i.e., O-ring or seal gasket).

The cover 104 further defines a sloping interior ran 108 that is generally funnel-like in shape, albeit possibly not conical in cross-section, because the die 10 may be square or rectangular rather than circular in planar shape. The cover 104 may be a molded plastic component, a stamped metal component, or a component formed of a different material and/or in a different way. The second pressure sensor assembly 100 further comprises a plurality of solder joints 116 that electrically connect the die 10 to the substrate 112 using flip chip mounting technology. In an embodiment, no underfill is disposed between the die 10 and the substrate 112. In another embodiment, however, underfill is disposed between the die 10 and the substrate 112. See the description above with reference to FIG. 2A, FIG. 2B, and FIG. 2C for further discussion of the use of underfill iii flip chip pressure sensor assemblies.

The second pressure sensor assembly 100 further comprises at least one vent hole 114 which may be located in the substrate 112 (e.g., a drilled or a routed through hole) or in a side wall of the cover 104. The same remarks about the manufacturing costs of providing a vent hole in the cover 104 versus providing a vent hole in the substrate 112 apply here, but FIG. 3 illustrates the vent hole 114 located in the substrate 112 to illustrate this alternative location of vent holes versus the location illustrated in FIG. 2A. The vent hole 114 provides fluid communication between an exterior ambient pressure and an interior chamber of the second pressure sensor assembly 100, where the interior chamber is defined as the space between the gel disk 102, the cover 104, the seal 110, the substrate 112, and the "top" side of the pressure sensor die 10. Thus, the pressure sensor die 10 in the second pressure sensor assembly 100 provides an electrical indication of a pressure differential between ambient pressure (or any other reference pressure that may be provided via the vent hole 114) and a fluid pressure applied to the "bottom" side of the diaphragm 12 by the gel disk 102, where the gel disk 102 couples a fluid pressure incident on its surface, for example an air pressure, a gas pressure, a liquid pressure, or other fluid pressure, to the "bottom" side of the diaphragm. In an embodiment, the second seal 110 may not be continuous and may provide fluid communication between the exterior ambient pressure and the interior chamber of the second pressure assembly 100 and no separate vent hole 114 may be provided.

When liquid gel is poured into the aperture defined by the cover 104, the liquid gel flows onto the "bottom" surface of the die 10, fills up onto the sloping interior wall 108 of the cover 104, up to the edge of the outer shoulder 106, up onto the flat surface of the outer shoulder 106, and flows toward the sharp drop-off surface of the outer edge of the cover 104. As the liquid gel flows out to the sharp drop-off surface, the liquid gel stops and beads-up, forming a generally domed or convex shape across the aperture defined by the cover 104. Without wishing to be bound by theory, it is thought that fluid dynamic properties of the liquid gel, specifically with reference to surface tension effects and adhesion effects, account for this behavior: while the relative contact angle between the liquid gel and the surface does not change, the absolute contact angle with respect to the horizontal of the flat surface of outer shoulder 106 increases dramatically at the outside edge of the outer shoulder 106, due to the drop-off of the surface of the cover 104. In an embodiment, the liquid gel is a dielectric gel.

It has been found that narrowing the outer shoulder 106 to such an extent that there is no flat surface for the gel to flow out onto does not promote formation of the desired gel dome, even with a sharp drop-off surface outside of the excessively narrow outer shoulder: in this case the liquid gel spills over the outer edge without any significant doming. Additionally, it has been found that if the outer edge of the outer shoulder 106 does not drop off sharply, even with an ample flat surface in the outer shoulder 106, the liquid gel spills over the outer edge without any significant doming. The combination, however, of the sufficiently wide flat outer shoulder 106 and a sufficiently sharp drop-off of the surface outside of the outer shoulder 106 does promote the forming of the dome.

In an embodiment, a sufficiently sharp drop-off may be achieved by keeping the radius of the transition from the flat surface of the outer shoulder 106 to the drop-off surface to less than about 0.1 mm. In other embodiments, the transition from the flat surface of the outer shoulder 106 to the drop-off surface may be maintained to less than a different radius, for example less than about 0.5 mm or less than about 0.05 mm. It will be appreciated that maintaining a radius in a manufactured part such as the cover 104 to less than 0.1 mm (or less than 0.5 mm or less than about 0.05 mm) poses some challenges. For example, a specialized tool for producing the cover 104 may be designed to employ replaceable inserts that are removed and replaced relatively frequently during manufacturing of the cover 104 as the inserts wear down. Replacing the inserts may be desirable to maintain the radius of the transition from the flat surface of the outer shoulder 106 to the drop-off surface below the desired maximum radius. In an embodiment, a sufficiently wide flat outer shoulder 106 is at least 0.5 mm wide, at least 0.1 mm wide, or at least 0.05 mm wide.

After filling the liquid gel into the cover 104 to form gel disk 102, the gel is cured. In an embodiment, a vacuum is applied to the second pressure sensor assembly 100 during the gel curing phase of manufacture and heat is applied to the gel. After curing, the gel disk 102 retains the domed shape. In an embodiment, the gel disk 102 comprises a soft dielectric gel.

In an embodiment, after curing, the dome of the gel disk 102 may project about 100 µm (about $4/1000^{th}$ inch) above the flat surface of the outer shoulder 106. While this may seem an insignificant feature, it has been found that this small dome promotes advantages of more reliable and more consistent linear pressure sensing response in gel coupled flip chip pressure sensor assemblies. Some techniques of forming the gel disk 102 in larger pressure sensor assemblies are thought to not work well on the smaller physical scale of flip chip pressure sensor assemblies. For example, pouring a gel disk that is larger than the outer edge of the cover 104 and then cutting off and removing the excess gel would be expected to produce a gel disk that introduces inaccuracies related to gel compression aberration due to inconsistent gel skin performance (the cut gel skin doesn't perform like uncut gel skin).

When force is applied to the gel disk 102, for example by a finger press or by a mechanical plunger pressed by a finger or other mechanical force, the force is transmitted through the gel disk 102 to the diaphragm 12. The domed shape or convex shape of the gel disk 102 contributes to linearity of response and/or pressure indication output of the second pressure sensor assembly 100. Additionally, the sloping interior wall 108 of the cover 104 also promotes linearity by minimizing any distortion effects that may occur if pressure is applied locally closer to the outside edge of the gel disk 102.

Figure 4A:
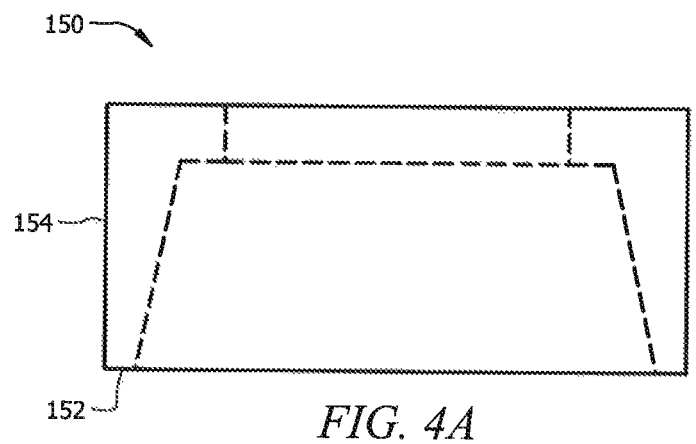
FIG. 4A is an illustration of a cover component of a flip chip pressure sensor assembly according to an embodiment of the disclosure.
Figure 4B:
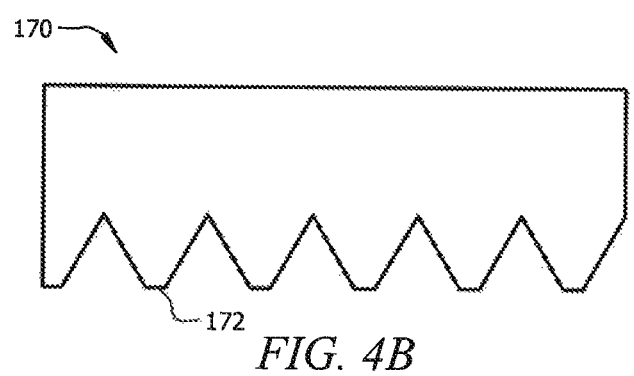
FIG. 4B is an illustration of another cover component of a flip chip pressure sensor assembly according to an embodiment of the disclosure.
Figure 4C:
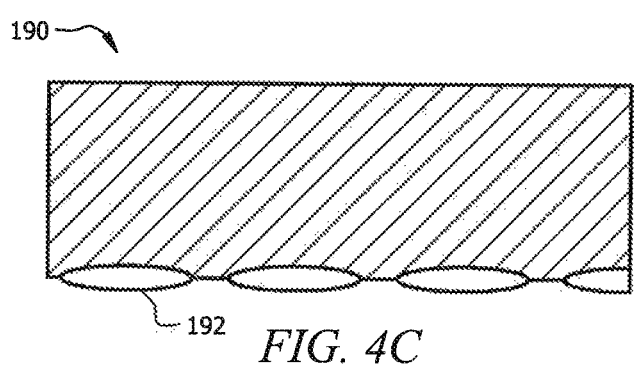
FIG. 4C is an illustration of yet another cover component of a flip chip pressure sensor assembly according to an embodiment of the disclosure.

Turning now to FIG. 4A, FIG. 4B, and FIG. 4C, a plurality of alternative covers are described. In one or more embodiments, the covers described with reference to FIG. 4A, FIG. 4B, and FIG. 4C may be used in manufacturing the first pressure sensor assembly 50 described with reference to FIG. 2A, FIG. 2B, and FIG. 2C or in manufacturing the second pressure sensor assembly 100 described with reference to FIG. 3, with the modification that in the first pressure sensor assembly 50 the second seal 56 would be omitted, and in the second pressure sensor assembly 100 the seal 110 would be omitted. Each of the covers 150, 170, and 190 share a common property that the lower end of the covers (the end that would be in contact with the substrate 58, 112) is collapsible or deformable by design. As used herein above, the term "collapse" does not mean total structural failure of a cover but a controlled, progressive, and/or modulated deformation of the cover. While not illustrated in FIG. 4A, FIG. 4B, or FIG. 4C, it is understood that each of the covers 150, 170, 190 defines an aperture that aligns with the pressure sensing diaphragm 12 of the pressure sensor die 10 so as to provide a path for pressure and/or force to be transmitted through the aperture to the "bottom" side of the diaphragm 12 (via the gel disk 102 in the case of the second pressure sensor assembly 100) when used in manufacturing the pressure sensor assembly 50, 100.

As the size of the pressure sensor die 10 is reduced, the size of the cover employed to make the pressure sensor assembly 50, 100 is likewise reduced in size. The manufacturing processes for fabricating the cover 52, 104 and of making the seals 54, 56, 110, 111 may not be as precise as the MEMS manufacturing processes used for fabricating the die 10. Manufacturing process variations in making the cover 52, 104 may create challenges in establishing the seals 54, 56, 110, 111. Using extra adhesive or glue to make up seals 54, 56, 110, 111—in order to compensate for manufacturing variation in cover dimensions—may produce undesirable inconsistencies in the performance of the pressure sensor assemblies 50, 100. By using covers with partially-collapsing or controllably-collapsing walls, the cover may be pressed down to make a seal with the die 10, and dimensional variation in the walls may be accommodated by the collapse of the lower portion of the wall—more collapse for a taller cover, less collapse for a shorter cover. The partially- or controlled-collapsed wall would still provide some mechanical support for the cover, carrying some of the load of the cover that might otherwise be borne by the die 10 alone, thereby stressing the solder joints between the die 10 and the substrate 58, 112.

The cover 150 illustrated in FIG. 4A has walls 154 that are thinner at a lower end 152 that would be in contact with the substrate 58 when the cover 150 is used in fabricating the first pressure sensor assembly 50 and in contact with the substrate 112 when used in fabricating the second pressure sensor assembly 100. In an embodiment, the lower end 152 is less than 80% as thick as the upper end of the wall 154 before it meets the top of the cover 150 (e.g., the portion forming the shoulder of the cover). In an embodiment, the lower end 152 is less than 50% as thick as the upper end of the wall 154. In an embodiment, the lower end 152 is less than 30% as thick as the upper end of the wall 154. In an embodiment, the lower end 152 is less than 15% as thick as the upper end of the wall 154. The wall thickness may progressively thin from the upper end of the wall 154 to the lower end 152. The thinness of the lower end 152 of the wall 154 may be modulated during fabrication to make the collapse of the lower portion of the wall 154 during fabrication a controlled, progressive, and/or modulated collapse. This may also be referred to as a partial collapse or a graceful collapse.

This collapse may take the form of the lower portion of the wall 154 of the cover 150 deforming by splaying outwards away from the die 10. In an embodiment, the wall 154 of the cover 150 or a lower portion of the wall 154 of the cover 150 may angle outwards, away from the die 10, to promote the splaying deformation. The collapse may take the form of the lower portion of the wall 154 of the cover 150 deforming in an accordion-like or bellows-like manner. In an embodiment, the wall 154 of the cover 150 or a lower portion of the wall 154 of the cover 150 may be pre-bent or pre-stressed to promote such an accordion-like collapse mode. While no vent hole in the cover 150 is illustrated in FIG. 4A, in an embodiment, the cover 150 defines a vent hole in the wall 154.

The cover 170 illustrated in FIG. 4B has feet 172 at a lower end of a wall of the cover 170. In some contexts, the feet 172 may be referred to as narrow fingers. The narrow part of the feet 172 is a concentrated point of structural weakness of the wall of the cover 170 and will be the place where controlled, progressive, and/or modulated deformation of the cover 170 may occur. The collapsibility of the cover 170 may be controlled by making the feet 172 more or less thin, making the number of feet 172 more or less, and/or making the cut-out area between the feet 172 deeper or less deep. The lower part of the outside wall of the cover 170 may slope outwards, away from the die 10. In an embodiment, the feet 172 may be pre-stressed or pre-bent to promote an accordion-like or bellows-like collapse mode. In an embodiment, the cover 170 may define a vent hole or may have a vent hole formed in a wall of the cover 170. Alternatively, the space between the feet 172 provides communication with ambient and may obviate the formation of another vent hole.

The cover 190 illustrated in FIG. 4C has collapsible ribs or spring-like structures 192. The collapsible ribs may be formed in manufacturing by cutting a hole leaving the thin collapsible rib 192 in place. During manufacturing, the cover 190 may be pressed down onto the substrate 58, 112, causing the collapsible rib 192 to collapse partially. In an embodiment, the cover 190 may define a vent hole or may have a vent hole formed in a wall of the cover 190. Alternatively, the space between the ribs 192 and the solid wall of the cover 190 may provide communication with the ambient and may obviate the formation of another vent hole.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A flip chip pressure sensor assembly, comprising:
   a substrate;
   a pressure sensor die comprising a pressure sensing diaphragm, the die having a top side and a bottom side that is reverse to the top side, where the top side of the die is electrically connected to the substrate by flip chip mounting technology;
   a cover defining an aperture disposed over the pressure sensor die, where the aperture defined by the cover aligns with the pressure sensing diaphragm to provide a path for pressure to be transmitted through the aperture to the bottom side of the pressure sensing diaphragm;
   a seal between the cover and the pressure sensor die; and
   a vent hole that communicates with an interior chamber of the flip chip pressure sensor assembly, wherein the interior chamber is defined at least in part by the cover, the pressure sensor die, and the substrate.

2. The flip chip pressure sensor assembly of claim 1, wherein the pressure sensor die is a microelectromechanical (MEMS) device and comprises at least one piezoresistive component.

3. The flip chip pressure sensor assembly of claim 2, wherein a planar area of the top side of the pressure sensor die is less than about 25 square millimeters (mm$^2$).

4. The flip chip pressure sensor assembly of claim 1, wherein the cover defines an inner shoulder at a first end of the cover and the seal is disposed between the inner shoulder of the cover and an outer perimeter of the pressure sensor die, further comprising a seal between a second end of the cover and the substrate.

5. The flip chip pressure sensor assembly of claim 4, wherein the cover comprises the vent hole in a side wall of the cover that communicates with an interior chamber of the flip chip pressure sensor assembly defined by the seal between the inner shoulder of the cover and the outer perimeter of the pressure sensor die, by the seal between the second end of the cover and the substrate, by the cover, by the top side of the pressure sensor die, and by the substrate.

6. The flip chip pressure sensor assembly of claim 4, wherein the substrate comprises the vent hole that communicates with an interior chamber of the flip chip pressure sensor assembly defined by the seal between the inner shoulder of the cover and the outer perimeter of the pressure sensor die, by the seal between the second end of the cover and the substrate, by the cover, by the top side of the pressure sensor die, and by the substrate.

7. The flip chip pressure sensor assembly of claim 1, wherein no backfill is disposed between the top side of the pressure sensor die and the substrate.

8. A pressure sensor assembly, comprising:
   a substrate;
   a pressure sensor die comprising a sensing diaphragm, the die electrically connected to the substrate;
   a cover defining an aperture disposed over the pressure sensor die, where the aperture defined by the cover aligns with the sensing diaphragm to provide a path for pressure to be transmitted through the aperture to the sensing diaphragm; and
   a gel disk disposed within the aperture in intimate contact with the sensing diaphragm, where the gel disk is domed above an outer shoulder of a rim defined by the cover.

9. The pressure sensor assembly of claim 8, wherein the outer shoulder of the rim defines a flat surface and an outer edge defined by a drop-off of a surface of the cover with an angle of at least 220 degrees with the flat surface of the outer shoulder and having a radius of less than 0.1 millimeter (mm).

10. The pressure sensor assembly of claim 9, wherein the gel disk extends out onto the flat surface of the outer shoulder of the rim and stops at the outer edge defined by the drop-off of the surface of the cover.

11. The pressure sensor assembly of claim 8, wherein the aperture defined by the cover defines a funnel shape proximate to the outer shoulder of the rim defined by the cover.

12. The pressure sensor assembly of claim 8, further comprising a seal between the cover and the substrate.

13. The pressure sensor assembly of claim 12, wherein the cover comprises a vent hole in a side wall of the cover that communicates with an interior chamber of the pressure sensor assembly defined by the gel disk, by the seal between the cover and the substrate, by the cover, by the pressure sensor die, and by the substrate.

14. The pressure sensor assembly of claim 13, wherein no backfill is disposed between the pressure sensor die and the substrate.

15. The pressure sensor assembly of claim 12, wherein the substrate comprises a vent hole that communicates with an interior chamber of the pressure sensor assembly defined by the gel disk, by the seal between the cover and the substrate, by the cover, by the pressure sensor die, and by the substrate.

16. The pressure sensor assembly of claim 8, where the pressure sensing die has a top side and a bottom side that is reverse to the top side, where the top side of the die is electrically connected to the substrate by flip chip mounting technology, and where the cover aligns with the sensing diaphragm to provide a path for pressure to be transmitted through the aperture to the bottom side of the sensing diaphragm.

17. A pressure sensor assembly, comprising:
   a substrate;
   a pressure sensor die comprising a sensing diaphragm, the die electrically connected to the substrate;
   a cover defining an inner shoulder at a first end of the cover, defining an aperture disposed over the pressure sensor die, and defining one of a deformable wall or a collapsible wall at a second end of the cover opposite to the first end, where the aperture defined by the cover aligns with the sensing diaphragm to provide a path for pressure to be transmitted through the aperture to the sensing diaphragm and where the second end of the cover is in intimate contact with the substrate; and a seal between the inner shoulder of the cover and an outer perimeter of the pressure sensor die.

18. The pressure sensor assembly of claim 17, wherein the wall at the second end of the cover is less than 80 percent as thick as the wall in a middle of the wall of the cover.

19. The pressure sensor assembly of claim 17, wherein the second end of the cover defines crush ribs.

20. The pressure sensor assembly of claim 17, wherein the second end of the cover defines narrow fingers that contact the substrate.

* * * * *